United States Patent [19]
Chow et al.

[11] 3,975,586
[45] Aug. 17, 1976

[54] AUTOMATIC LOW FREQUENCY GAIN LIMITED CIRCUIT FOR ELIMINATING SIGNAL SUPPRESSION IN AN A-C COUPLED VIDEO PROCESSING SYSTEM

[75] Inventors: Sen-Te Chow; John J. Pupich, both of Alexandria, Va.

[73] Assignee: The United States of America as represented by the Secretary of the Army, Washington, D.C.

[22] Filed: June 16, 1975

[21] Appl. No.: 587,518

[52] U.S. Cl. .......................... 178/7.5 R; 178/7.3 R
[51] Int. Cl.² ...................... H04N 5/20; H04N 5/52
[58] Field of Search ....... 178/7.3 R, 7.5 R, DIG. 26, 178/DIG. 16, 7.3 DC

[56] References Cited
UNITED STATES PATENTS

| | | | |
|---|---|---|---|
| 3,396,236 | 8/1968 | Foster | 178/DIG. 26 |
| 3,458,652 | 7/1969 | McMann, Jr. | 178/DIG. 16 |

*Primary Examiner*—Robert L. Griffin
*Assistant Examiner*—Mitchell Saffian
*Attorney, Agent, or Firm*—Nathan Edelberg; Max L. Harwell; Robert P. Gibson

[57] ABSTRACT

A means of eliminating signal suppression in an A-C coupled video processing system by an automatic low frequency gain limiting circuit means. The low frequency gain limiting circuit means comprises a summing amplifier that simultaneously sums the original video pulses and inverted pulses of the low frequency pedestal portion of the video pulses with the detail information removed therefrom. The resulting gain limited output video voltage from the summing amplifier is confined within the linear dynamic range of the video processing system and comprises a compressed pedestal height that nevertheless has all the detail information thereon. The gain limited output voltage is applied to a display driver.

7 Claims, 5 Drawing Figures

AUTOMATIC LOW FREQUENCY GAIN LIMITED CIRCUIT FOR ELIMINATING SIGNAL SUPPRESSION IN AN A-C COUPLED VIDEO PROCESSING SYSTEM

The invention described herein may be manufactured, used, and licensed by or for the Government for governmental purposes without the payment to us of any royalty thereon.

BACKGROUND OF THE INVENTION

This invention is in the field of A-C coupled video processing systems. A problem in these A-C coupled video processing systems is streaking, which is caused by one signal overriding or suppressing another signal due to large temperature differences, light intensity differences, etc. emitted from the field of view into the bank of detectors of the video processing systems. Some means is needed to suppress the overriding signals yet retain the resolution, or stated another way, some means is needed to keep the output voltage level confined within the linear dynamic range of the system yet allow the gain of the high frequency detail of the targets to remain unchanged thus preserving signal quality. The present invention solves the above problem.

SUMMARY OF THE INVENTION

The present invention comprises an electronic means that is inserted in the video channels between the last post amplifier and the input to a light display device driver in which the electronic means limits the amplitude of the low frequency voltage component of the video signal at the input to the driver. The electronic means reduces the gain of the low frequency signal component of the video signal when the voltage level exceeds the white streaking detection level, and likewise reduces the gain of the low frequency signal component when the voltage level goes below the black streaking detection level. The gain of the high frequency component, which rides on the low frequency component, remains unchanged during this operation.

The electronic means comprises an inverter circuit that inverts the low frequency voltage component of the video signal when the video signal goes above the white streaking level amplitude or goes below the black streaking level amplitude and removes the high frequency voltage component resulting in a non-detail information inverted square wave that is summed with the original video signal in a summing amplifier. The summed voltage contains the exact high frequency detail information but the low frequency voltage component is kept within the amplitude limits where no streaking occurs on the light display device. The original detail information is preserved as well as the linear dynamic range of the A-C coupled video processing system.

DETAILED DESCRIPTION OF THE PREFERRED EMBODIMENT

Figure 1:
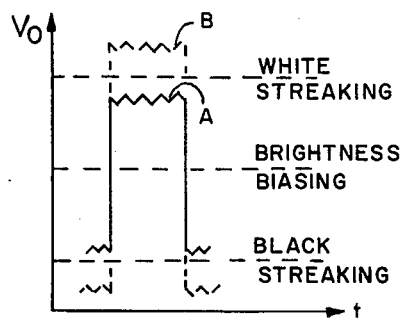
FIG. 1 illustrates two wave forms in which one is within and the other is outside the dynamic range of an A-C coupled video processing system.

Refer now to FIG. 1 for a brief discussion of the streaking problem at the viewing end of an A-C coupled video processing system. First, the composite video signal in an A-C coupled video processing system has both a low frequency, or pedestal and a high frequency, or target detail information, components included therein. If the amplitude of the low frequency voltage component exceeds a certain level, streaking of the detail information results. This streaking problem is the result of signal suppression, which is an inherent problem associated with all A-C coupled video processing systems. FIG. 1 illustrates the waveforms of two video signals based on the output video signal $V_0$ versus time, represented by t. Waveform A is within the dynamic range of the system, which range being between the white streaking level and the black streaking level. However, as a signal grows in intensity, such as a hotter signal in an A-C coupled thermal imaging video processing system or a more intense light in an A-C coupled television monitoring or cathode ray tube video processing system, the video signal increases in amplitude on each side of the brightness biasing level. Waveform B represents the waveform of such an increased video signal that extends beyond the dynamic range of the A-C coupled video processing system and results in a suppression streaking problem.

Figure 2A:
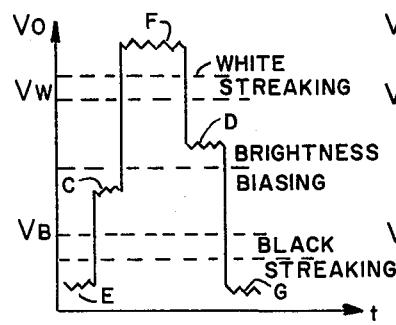
FIG. 2(A) illustrates a video signal without low frequency gain limiting of the present invention.
Figure 2B:
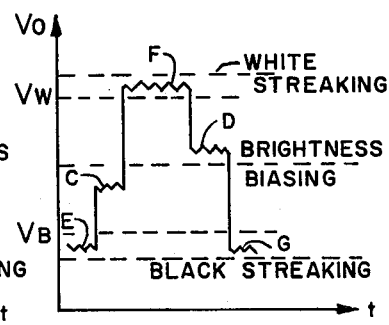
FIG. 2(B) shows the same video signal of FIG. 2(A) after the signal has passed through the low frequency gain limiting circuit.

Look now at FIGS. 2(A) and 2(B) for the comparison of a video signal at the input to the driver for a light display device without the use of the low frequency gain limiting circuit and with the use of the automatic low frequency gain limiting circuit. The operation of the automatic low frequency gain limiting circuit will be explained in detail below with reference to FIGS. 3 and 4. However, FIGS. 2(A) and 2(B) are presented to show the results of the automatic low frequency gain limiting circuit on the video signals that are outside the linear dynamic range of an A-C coupled video processing system. Only those video signals that exceed the white streaking sensing level $V_W$, or fall below the black streaking sensing level $V_B$, will be detected and operated on to reduce the amplitude of the pedestal back into the dynamic range of the system. The detail information that rides on the pedestal is unaffected during this operation. Look now at FIGS. 2(A) and 2(B) and particularly at the high frequency, or detail information, portions C, D, E, F, and G. The pedestal of the video signal that has amplitude extending past the white and black streaking sensing levels $V_W$ and $V_B$ in FIG. 2(A) is limited in pedestal amplitude in FIG. 2(B). The amplitudes representing the detail information of the high frequency portions C, D, E, F, and G remain unchanged. However, portions E and G are moved up and the F portion is moved down to within the linear dynamic range or the detail information would be lost due to streaking.

Figure 3:
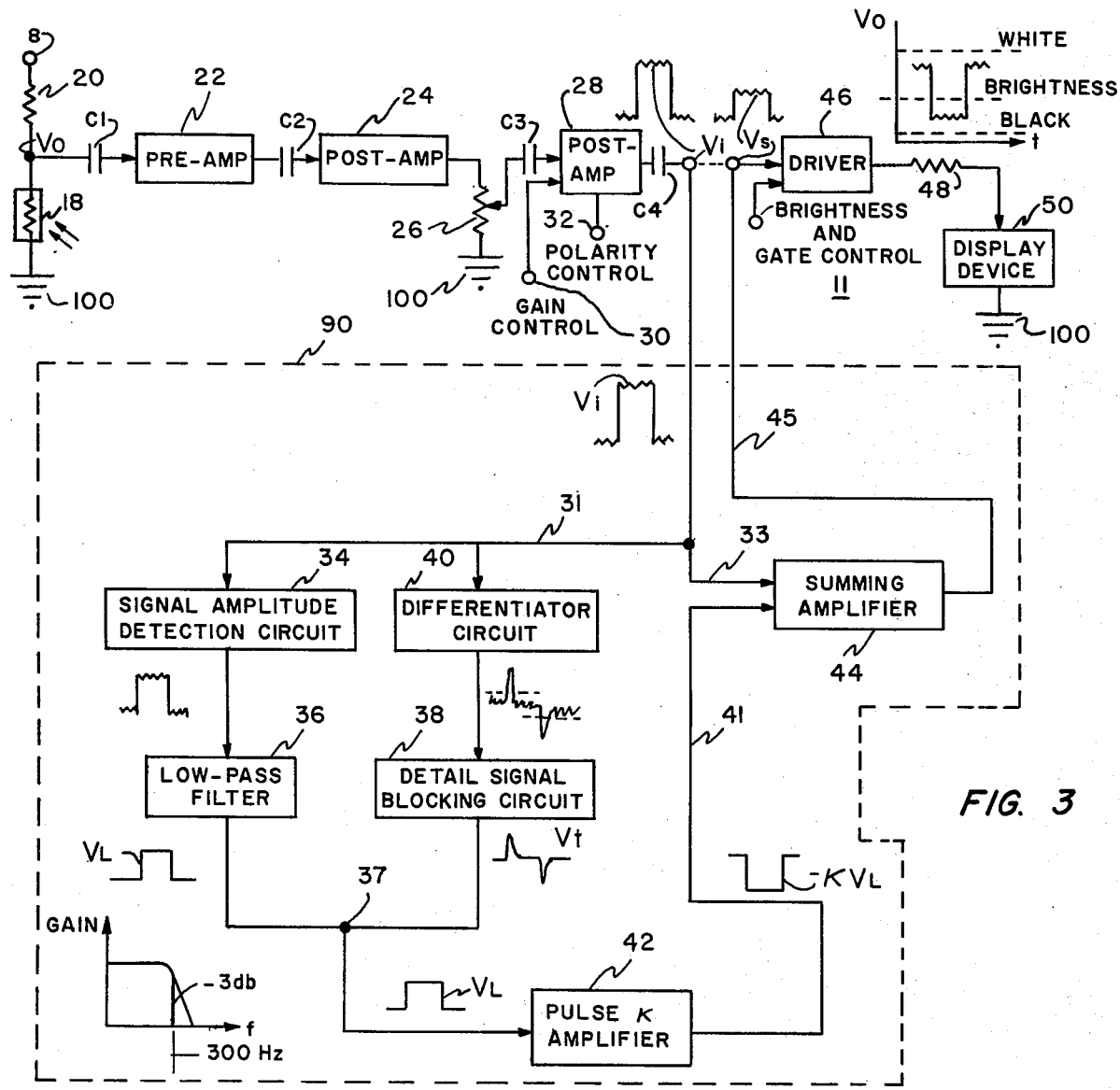
FIG. 3 shows in block diagram form a common module video channel with the present low frequency gain limiting circuit connected thereto.

FIG. 3 illustrates in block diagram form one of a plurality of common module video channels that form an A-C coupled video processing system. One of the automatic low frequency gain limiting circuits is shown connected thereto. A detector 18 is placed in series with a detector bias resistor 20 between ground 100 and detector bias voltage 8. Capacitor C1 couples the detected video signal voltage $V_D$ to a preamplifier 22. Capacitor C2 couples the preamplified signal to a first post amplifier 24. The gain of the output from amplifier 24 is trimmed by potentiometer 26 and is coupled through capacitor C3 to a second post amplifier 28. Amplifiers 22, 24, and 28 are inverting amplifiers that amplify the detected video signal voltage $V_D$ into an input voltage $V_i$ at the input to the automatic low frequency control circuit 90. The gain control for post amplifier 28 shown at terminal 30 and the polarity control shown at terminal 32 are both manually controlled to adjust the video processing system in gain and polarity respectively as needed.

The function of the automatic low frequency gain control circuit 90 is to limit the pedestal or low frequency component height, or amplitude, of the input voltage $V_i$ between the white streaking level and the black streaking level as explained herein above with reference to FIGS. 1, 2(A), and 2(B). If the input voltage $V_i$ is within the dynamic range, i.e. between the white streaking and black streaking detection levels of the video processing system, then $V_i$ passes directly along lead 33 to summing amplifier 44 and out along lead 45 to one input of a light display device driver 46. However, assume that input voltage $V_i$ is outside the dynamic range of the video processing system. With $V_i$ outside the dynamic range, the input voltage $V_i$ is not only applied on lead 33 to one input of summing amplifier 44, but it is also operated on by a parallel network having input lead 31. The parallel network comprises in one leg a serially connected signal amplitude detection circuit 34 and low pass filter 36, and in another leg a serially connected differentiator circuit 40 and detail signal blocking circuit 38. Detection circuit 34 detects and passes on to the low pass filter 36 the portion of the input voltage $V_i$ that is outside the sensing voltage levels $V_W$ and $V_B$ as shown in FIGS. 2(A) and 2(B). Since the high frequency detail information was outside the sensing voltage levels $V_W$ and $V_B$, this high frequency portion remains on the voltage wave applied to the input of the low pass filter 36. As an example, the rate of the pedestal pulses may be 120 pulses per second. The —3db roll off frequency of low pass filter 36 is about 300 Hertz. The resulting low frequency component $V_L$ at the immediate output filter 36 has rounded leading and trailing edges. The other leg of the parallel network compensates for these round edges. Differentiator circuit 40 generates trigger pulses each time the input voltage $V_i$ is applied thereto. These trigger pulses at the output of differentiator circuit 40 contain the high frequency detail information from the input signal $V_i$ thereon. These trigger pulses are however passed through a detail signal blocking circuit 38 for removing the detail information therefrom, resulting in a non-detail signal trigger pulse.

The non-detail signal trigger pulses $V_t$ are combined with the low frequency component voltages $V_L$ that still has rounded edges thereon. Pulses $V_t$ and the low frequency component voltages $V_L$ are combined at a summing node 37. The resulting square wave voltage $V_L$ is applied to the input of a negative input operational amplifier 42. The inverted and amplified square wave $-\kappa V_L$ from amplifier 42 is applied by lead 41 as a second input to summing amplifier 44. The original input video signal $V_i$ is summed with the inverted square wave $-\kappa V_L$ in amplifier 44. Thus, the output voltage of summing amplifier 44 is $V_i - \kappa V_L$ which contains all of the high frequency detail information but has a reduced pedestal height of the original input video signal $V_i$. It is important to note that the automatic low frequency gain control circuit 90 will not remove the detail information at the input to the light display device driver 46.

Driver 46 has a second input voltage on terminal 11 that is manually controlled brightness level and gate control. The output from the driver is applied to light display 50, such as a light emitting diode or a cathode ray tube, through resistor 48, with the light display device connected to ground 100. A typical output voltage $V_O$ is shown above resistor 48.

Figure 4:
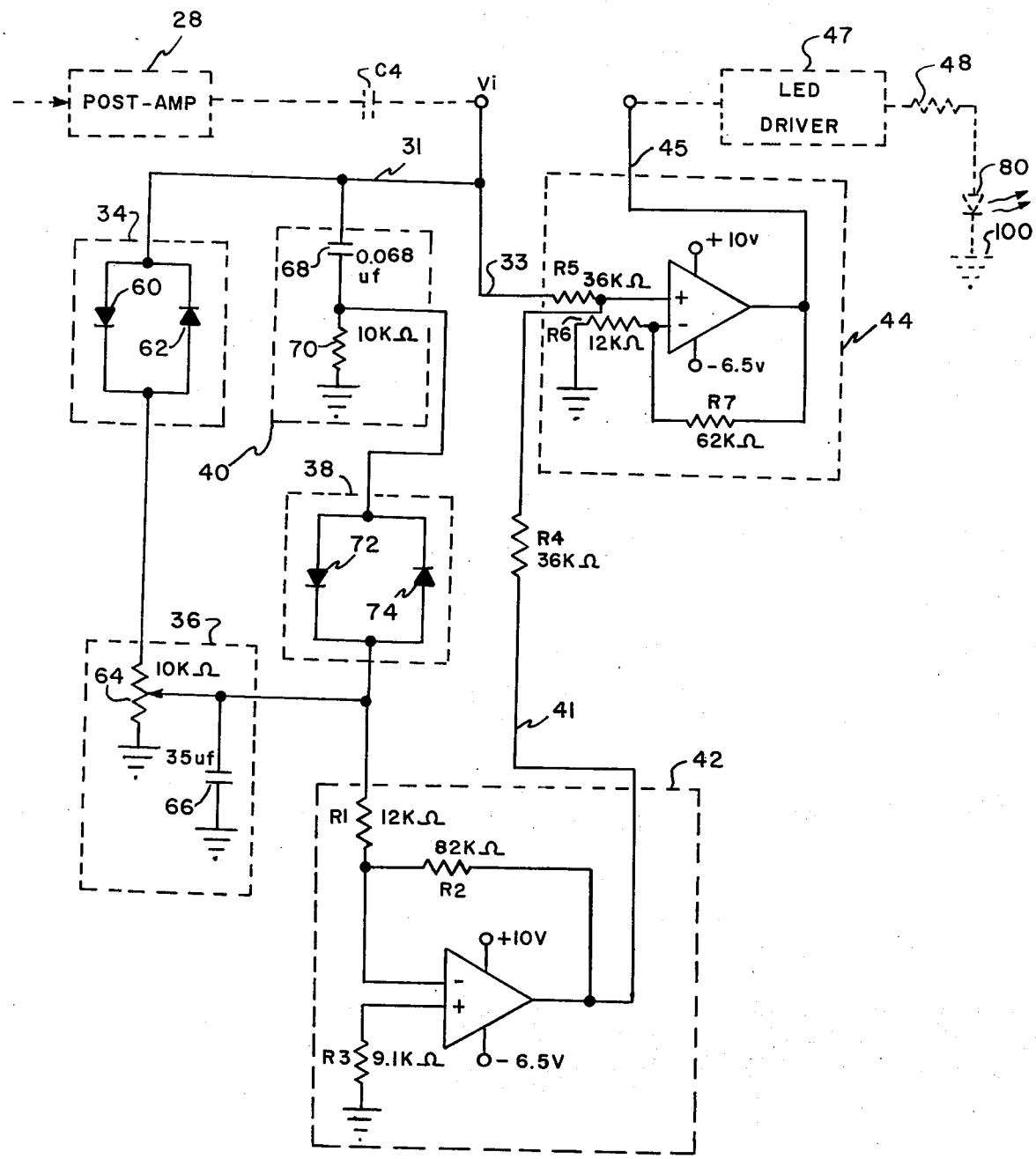
FIG. 4 is a schematic of the low frequency gain limiting circuit.

FIG. 4 is similar to FIG. 3 but has more detail of one specific automatic low frequency gain limiting circuit used with an A-C coupled terminal imaging video processing system. The second post amplifier 28 and coupling capacitor C4 are the same as discussed in FIG. 3. A light emitting diode driver 47 and light emitting diode 80 are specifically referenced in this embodiment. The signal amplitude detection circuit 34 may be back-to-back diodes 60 and 62. The forward threshold voltages of diodes 60 and 62 correspond respectively to the white streaking sensing voltage level $V_W$ and the black streaking sensing voltage level $V_B$. For example, when video signal $V_i$ reaches the $V_W$ voltage level diode 60 will conduct passing the voltage in excess of $V_W$ on to the low pass filter 36. Likewise, when the video signal $V_i$ goes below the $V_B$ voltage level diode 62 will conduct passing the voltage in excess of $V_B$ on to the low pass filter 36.

Low pass filter comprises a parallelled variable resistor 64 and capacitor 66 connected to ground. The variable resistor 64 is variable so as to select the magnitude and roll off frequency for the low frequency component voltage $V_L$. As stated above, the —3db roll off frequency of low pass filter 36 may be about 300 Hertz.

The differentiator circuit 40 comprises a serially connected capacitor 68 and resistor 70 connected to ground. Capacitor 68 may be about 0.068 microFarads, and resistor 70 may be about 10 kilo-ohms for proper operation. Resistor 70 has to be large enough so it will not load down the low frequency signal $V_L$. Differentiator circuit 40 generates trigger pulses to compensate for pedestal edge droop distortion whenever the pulse amplitude exceeds the forward threshold breakdown voltages of back-to-back diodes 72 and 74 in the detail signal blocking circuit 38. There is some high frequency droop distortion but it is of no concern since the high frequency signal takes such a short period of time.

The non-detailed signal trigger pulses $V_t$ are summed with the low frequency square wave $V_L$ at node 37 with the resulting voltage applied to a general purpose negative input operational amplifier 42. Typical values for resistors R1, R2, and R3 and the biasing voltages for amplifier 42 are as shown in FIG. 4. The inverted output from amplifier 42 is fed to a positive input unit gain summing amplifier 44. Typical values for resistors R5, R6, and R7 and the biasing voltages for amplifier 44 are as shown in FIG. 4. The output from amplifier 44 contains the pedestal height limited signal with the detail information still in tach thereon. Therefore, the light emitting diode driver 47 does not drive the light emitting diode 80 into either the white or black streaking levels. The light emitting driver 47 has a gain of about —6.

Advantages derived from the automatic low frequency gain limiting circuit are as follows. It preserves the original high frequency detail information. It also preserves the advantage of A-C coupled video systems that give an expansion of the dynamic range. That is, the dynamic range is determined from a line basis and not from a frame basis as is the case of a DC restoration system. Further, since this system is completely electronic, there is no requirement for a real image plane and therefor no modification of the system optics is required as is required in all presently utilized approaches to DC restoration.

We wish it to be understood that we do not desire to be limited to the exact details of construction shown and described, for obvious modifications will occur to a person skilled in the art.

We claim:

1. An automatic low frequency gain limiting circuit for limiting the amplitude of the low frequency pedestal component of a video signal in an A-C coupled video processing system, said automatic low frequency gain limiting circuit comprising:
   in a parallel network;
      a first leg having a serially connected video signal detector and low pass filter means therein for providing a non-detail information reduced height pedestal,
      a second leg having serially connected differentiator circuit and detail signal blocking circuit means for providing trigger pulses simultaneously with the changing level edges of said reduced height pedestal,
   a summing node for summing the output from said first and second legs of said parallel network to produce a square wave pedestal;
   a negative input pulse amplifier having said square wave pedestal applied at the input thereto for providing an amplified and inverted square wave pulse therefrom; and
   a summing amplifier for simultaneously summing said video signal and said inverted square wave pulse to provide an output video signal therefrom that retains the high frequency detail information thereon but has an amplitude limited low frequency pedestal to maintain operation of said video processing system within its dynamic range.

2. An automatic low frequency gain limiting circuit as set forth in claim 1 wherein said circuit more specifically comprises:
   a signal amplitude detection circuit for detecting said video signal and passing therefrom only the low frequency pedestal that exceeds an upper and a lower limit amplitude;
   a low pass filter serially connected at the output of said signal amplitude detection circuit for passing therefrom only the low frequency pedestal portion of said video signal without the detail information thereon;
   a differentiator circuit for differentiating said video signal;
   a detail signal blocking circuit serially connected at the output of said differentiator circuit for blocking the high frequency portion of said video signal from said differentiator circuit, said serially connected signal amplitude detector and low pass filter connected in parallel with said serially connected differentiator circuit and detail signal blocking circuit wherein trigger pulses from said differentiator and detail signal blocking circuits compensate for pedestal rounded edges from said low pass filter to form a square wave;
   a negative input operational amplifier for amplifying and inverting said square wave; and
   a summing amplifier for simultaneously summing said video signal and the inverted square wave wherein the output from said summing amplifier is said video signal whose low frequency pedestal is limited in amplitude between the white streaking and black streaking levels.

3. An automatic low frequency gain limiting circuit as set forth in claim 2 wherein said signal amplitude detection circuits comprises two opposing polarity parallel connected diodes that have a video signal voltage threshold detection level that is between the amplitude for white streaking and for black streaking.

4. An automatic low frequency gain limiting circuit as set forth in claim 3 wherein said differentiator circuit comprises a serially connected capacitor and resistor to ground wherein the resistance of said resistor is large enough not to load down said low frequency signal.

5. An automatic low frequency gain limiting circuit as set forth in claim 4 wherein said detail signal blocking circuit comprises an input connection between said resistor and capacitor of said differentiator circuit connected to two opposing polarity parallel connected diodes.

6. An automatic low frequency gain limiting circuit as set forth in claim 5 wherein said A-C coupled video processing system is a thermal viewing video processing system.

7. An automatic low frequency gain limiting circuit as set forth in claim 5 wherein said A-C coupled video processing system is a cathode ray tube video processing system.

* * * * *